(12) United States Patent
Cahoon et al.

(10) Patent No.: US 7,247,000 B2
(45) Date of Patent: Jul. 24, 2007

(54) WELD SHIELDING DEVICE FOR AUTOMATED WELDING OF IMPELLERS AND BLISKS

(75) Inventors: Christopher L. Cahoon, Mesa, AZ (US); Russell G. Swaffar, Mesa, AZ (US); Randall E. Dowding, Gilbert, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/930,407

(22) Filed: Aug. 30, 2004

(65) Prior Publication Data

US 2006/0045748 A1    Mar. 2, 2006

(51) Int. Cl.
   *F01D 25/00* (2006.01)
(52) U.S. Cl. .............................. 416/146 R; 416/213 R; 416/248
(58) Field of Classification Search ............ 416/146 R, 416/213 R, 248; 228/59, 119; 219/158, 219/160

See application file for complete search history.

(56) References Cited

U.S. PATENT DOCUMENTS 2,320,700 A    6/1943  Kent et al.
2,863,982 A   12/1958  Thorley et al.
3,450,857 A    6/1969  Webb (Continued)

FOREIGN PATENT DOCUMENTS

EP    1466695    10/2004

(Continued)

OTHER PUBLICATIONS

PCT International Search Report PCT/US2005/031074, Feb. 14, 2006.

*Primary Examiner*—Ninh H. Nguyen
(74) *Attorney, Agent, or Firm*—Ingrassia Fisher & Lorenz (57) ABSTRACT

The present invention provides an apparatus for use in automated welding repairs, particularly those repairs intended for impellers, blisks, and similar structures. There is provided a welding shield which is shaped to fit securely within valleys of an impeller. An individual shield is sized to match with a particular impeller design. When in place, the shield covers exposed areas of the valley and thus protects that area from welding damage. The shield may include welding resistant materials on exposed surfaces. A plurality of shields can protect as many impeller valleys as needed. The shield fits securely so that it does not dislodge during automated welding operations. If desired shields can be moved and repositioned so as to expose previously protected areas thus allowing welding to take place in the newly exposed areas.

14 Claims, 3 Drawing Sheets

U.S. PATENT DOCUMENTS

| | | | |
|---|---|---|---|
| 3,541,673 A | 11/1970 | Cushman | |
| 3,673,373 A | 6/1972 | Lovett | |
| 3,731,868 A * | 5/1973 | Arikawa et al. | 75/316 |
| 3,875,364 A | 4/1975 | Boyett | |
| 4,089,456 A | 5/1978 | Toppen et al. | |
| 4,170,473 A * | 10/1979 | Gerken | 419/9 |
| 4,172,974 A | 10/1979 | Stingelin et al. | |
| 4,182,951 A * | 1/1980 | Kuder | 219/160 |
| 4,270,256 A | 6/1981 | Ewing | |
| 4,437,710 A | 3/1984 | MacFarland et al. | |
| 4,686,341 A | 8/1987 | Nomura et al. | |
| 5,060,842 A | 10/1991 | Qureshi et al. | |
| 5,084,603 A | 1/1992 | Bernuchon et al. | |
| 5,094,381 A | 3/1992 | Amos et al. | |
| 5,290,989 A | 3/1994 | Zibilich et al. | |
| 5,361,972 A | 11/1994 | Barker | |
| 5,393,949 A | 2/1995 | Stricklen | |
| 5,484,973 A | 1/1996 | Gittens et al. | |
| 5,750,954 A | 5/1998 | White et al. | |
| 6,193,135 B1 | 2/2001 | Fang et al. | |
| 6,199,744 B1 | 3/2001 | Schneefeld et al. | |
| 6,255,616 B1 | 7/2001 | Offer | |

FOREIGN PATENT DOCUMENTS

| | | |
|---|---|---|
| JP | 56167802 | 12/1981 |
| JP | 63295802 | 12/1988 |
| RU | 2211126 | 8/2003 |

\* cited by examiner

WELD SHIELDING DEVICE FOR AUTOMATED WELDING OF IMPELLERS AND BLISKS

FIELD OF THE INVENTION

The present invention relates to welding. More particularly the invention is related to 3-D welding techniques used with complex machinery geometries such as turbine engine impellers and blisks. The invention more particularly relates to shielding methods and apparatus used to protect hot welding material from affecting adjacent areas of the work piece.

BACKGROUND OF THE INVENTION

Gas turbine engines have a number of complex components that require periodic inspection. It has been found quite useful to conduct these inspections, when possible, without tearing apart the engine. For example those gas turbine engines installed on aircraft are periodically inspected using a technique known as a borescope inspection. Borescope inspections typically involve the insertion of a viewing apparatus, a borescope, from the engine exterior, through an access port to some interior portion of the engine. In a typical arrangement a borescope includes a flexible wand that carries a light source and a vision means, such as a video camera. The wand is usually flexible and can be manipulated such that the borescope tip can be directed toward a target, in a desired direction. The light and vision means then allow an operator, positioned at some point remote from the engine, to view the desired point of the engine interior on a video screen. Turbine blades are one such engine component that are inspected periodically through borescopes for signs of cracking or deterioration. However, this general method of inspecting gas turbine engines has not been expanded to other kinds of engine repair and service. There is a need to adapt such methods of engine access to other repairs.

The modern jet aircraft is a very high capital thing. Demurrage costs and lost revenue potential that arise when an aircraft is out of service add to its operating cost. Thus maintenance and repair strategies associated with aircraft, and turbine engines in general, seek methods that have a quick turn around. The goal is to return the vehicle to service as quickly as possible consistent with quality and safety demands. There is a continuing need for improved repair methods that allow quicker and faster repairs that minimize the time that any vehicle is out of service.

Gas turbine engines include many components with complex shapes. Impellers and blisks for example have airfoils with surface curvature that extends in three dimensions. Impellers and blisks are being increasingly specified in modern design as a method to achieve high compression in relatively short lateral spaces. Additionally gas turbine enegine components, and especially impellers and blisks, are often fabricated from expensive alloy materials. Typical alloys include the class of material known as superalloys, alloys having a high level of nickel and/or cobalt. The complex design, and expensive materials, that are used to fabricate impellers and blisks often means that they can be quite expensive.

As a consequence of these design and material criteria, it is desirable to repair damaged components when possible. Various welding operations, including laser welding, have been developed to treat damaged components. Welding operations may include repair of cracked materials as well as material deposition to restore worn parts.

Welding operations used with impellers, blisks, and other complex geometries often benefit from computerized control of the welding operation. Computer programs that contain the geometry of the device are able to perform a welding operation in an automated fashion, often in a manner superior to that of human controlled weldng. The uniformity and reproducibility in computer-controlled welding operations is additionally desired as a way to eliminate the variability that comes in iterative human processes. This automated welding is most efficient when human interaction with the welding operation is held at a minimum.

However, the removal of the human component from a welding operation can itself lead to difficulties. One problem encountered with automated welding of turbine blisks and impellers is damage to areas proximate to the target zone of the work piece. Whereas a human operator could observe when damage is occurring and take steps to minimize the damage, a machine may not be able to do this. Thus, it would be desired to develop methods for computer-assisted welding that minimize welding-related damage.

Welding, as often practiced in automated welding repair of gas turbine engine components, often follows certain procedures and uses materials that can contribute to work piece damage. For example, the temperatures that are required to successfully weld superalloy materials are relatively high welding temperatures. The heat that is transferred into the substrate material and to the filler material (powder or wire feed) can affect neighboring areas of the work piece. Splatter damage can also result from heated materials at the target area impinging on other areas of the work piece. Again, it would be desired to develop techniques and materials that minimize this damage.

Additionally, an inert gas such as argon is often used in welding operations. An inert gas, which does not react with welding materials and base materials, minimizes the presence of oxygen and thus minimizes oxidation reactions, which can potentially weaken the weld. The inert gas can itself be heated to very high temperatures during the operation. The heated gas can warp or otherwise damage non-target areas of the work piece with which it comes into contact. This particularly occurs when a relatively large volume of heated gas reaches neighboring area. Consequently it would be desired to develop materials and techniques that minimize weld related damage arising from large volumes of heated inert gas.

The geometry of turbine engine blisks and impellers makes them particularly vulnerable to welding-related damage. (Blisk is the term used in the aeronatutical field for a unitary piece with a rotor and airfoils.) A blisk, for example, contains a series of airfoils that radiate out from a central hub. The airfoils may be in close proximity to one another, across the blisk. This close positioning of airfoils subjects neighboring airfoils to damage when heated debris or gases impinge on them.

Accordingly there is a need for an apparatus and method to protect airfoils from welding damage. It is desired that the apparatus be able to shield or protect airfoils and blisks from harm when neighboring airfoils are being welded. Further, it is desired that the apparatus, and method of using the apparatus, be suitable for use with automated welding systems. It is thus desired that the efficiency of automated welding systems not be unduly compromised by the protective apparatus and method. The present invention addresses one or more of these needs.

SUMMARY OF THE INVENTION

The present invention provides an apparatus and methods for use in automated welding repairs. In one embodiment, the invention provides a weld shielding device. The shield may be fitted into spaces on a turbine impeller or blisk. This shield protects vulnerable areas from being damaged by welding related debris and heat. The shield is adapted to automatic welding repair routines in that the shield may first be installed and the repair can then take place while the shield remains in place. The shield can be repositioned as welding repairs progress on a given piece of equipment.

In one embodiment, and by way of example only, there is provided a welding shield for use with a matching impeller comprising: a body having a front face and rear face, a top face and bottom face, and an inducer edge and an exducer edge; wherein the front face and rear face make substantial contact with a pressure face and back face of neighboring impeller airfoils; and wherein the body is shaped to fit firmly within a valley of the impeller. The bottom face may make substantial contact with the valley face of the matching impeller. The body of the welding shield may be oversized with respect to the matching impeller valley. The welding shield faces may be substantially flat or rounded and may include a weld-resistant material. The inducer edge and exducer edge do not, in one embodiment, extend significantly beyond the limits of the impeller airfoils when the shield is placed in a matching impeller. The top face does not extend significantly beyond the limits of the impeller airfoils, in one embodiment, when the shield is placed in a matching impeller.

In a further embodiment, still by way of example, there is provided a method to provide protection from welding related damage comprising the steps of: providing a shield having a front face and rear face, a top face and bottom face, and an inducer edge and an exducer edge; matching the shield to an impeller; and placing the shield in a matching impeller valley. The step of placing the shield may further comprise placing the shield in a matching impeller valley prior to an automated welding step. According to one embodiment of the method the front face and rear face make substantial contact with a pressure face and back face of neighboring impeller airfoils when the shield is placed in an impeller valley. In one embodiment the body is shaped to fit firmly within a matching impeller valley. The method may further comprise the step of placing the shield in a neighboring impeller valley of a valley to be welded, removing the shield upon completion of a welding step, and repositioning the shield to a new impeller valley upon completion of a welding step.

Other independent features and advantages of the weld shielding device for automated welding of impellers and blisks will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

It has now been discovered that repairs and maintenance on gas turbine engines, including welding repairs on gas turbine engine impellers and blisks, can be improved through the use of a weld shielding device. A heat shield may be utilized during automated welding programs in order to protect airfoils from damage during welding operations. The heat shield is sized and shaped so that it fits between adjacent airfoils. Thus, a single shield may be used for a blisk or airfoil of a given design.

Figure 1:
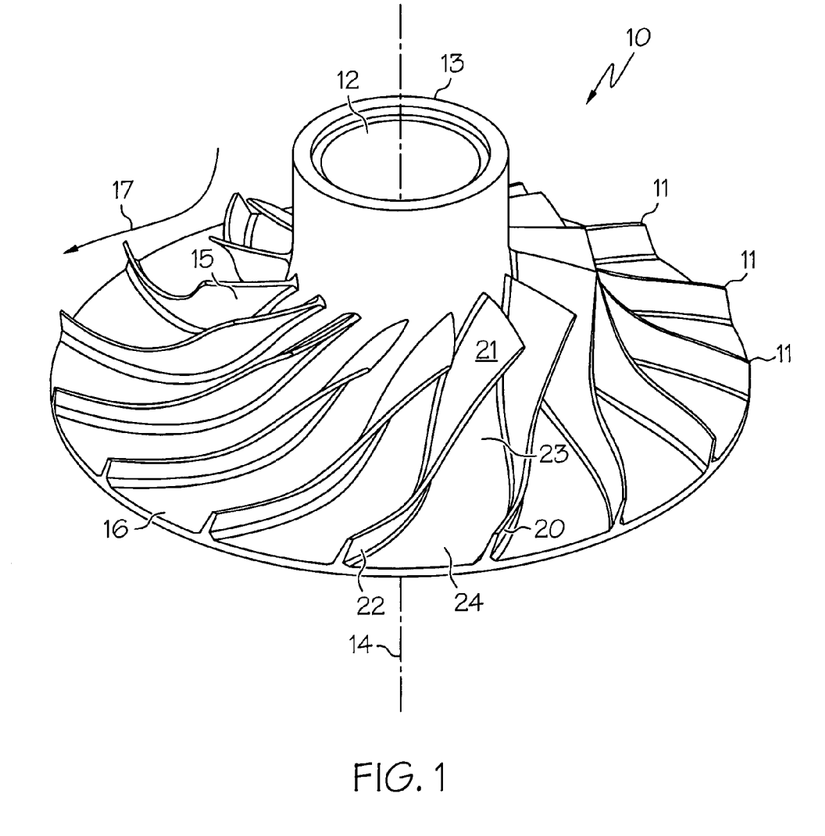
FIG. 1 is a perspective view of a gas turbine engine impeller such as may be used with the present invention.

Referring now to FIG. 1 there is shown a representation of a typical impeller suitable for use with the present invention. Impeller 10 includes a plurality of impeller airfoils 11 attached to a central core 12. Impeller 10 has a generally radial structure and, as shown in this figure, a central bore area 13. In some designs, impeller 10 is fabricated as a unitary piece with an axle and would not have an open bore area though it would have the corresponding bore region. Bore area 13 is aligned along an imaginary central axis 14 that runs through central bore area 13 in a axial direction. In operation impeller 10 is disposed on a central axle (not shown) at central bore area 13 and rotates thereon or rotates with the axle. Impeller blades 11 extend from central bore area 13 in an outwardly radial and axial direction. Impeller 10 further defines an upstream position 15 and downstream position 16. Upstream position 15 and downstream position 16 correspond to the fluid path flow through and across impeller 10. Fluid, air, first enters impeller 10 at the upstream position 15 (inducer). As air passes impeller 10 it exits in the downstream position (exducer). Air passing across impeller is pressurized such that the air exiting impeller 10 is at a higher temperature and pressure relative to the air entering impeller. The direction of air flow 17 across the face of impeller 10, the face being that portion of impeller 10 which is exposed to air flow. In operation, impeller 10 is disposed within a housing or structure (not shown) which, by close proximity to impeller blades 11, assists in placing the air under pressure.

In the impeller configuration as shown in FIG. 1, impeller blades 11 press against air as the impeller 10 rotates. Impeller blades act to compress the air. The rotation of impeller during this compression imparts high tensile stresses in the bore region. Thus, this is one area that may require welding repair. Simultaneously, air that exits impeller 10 at downstream position 16 (exducer) is typically at a much higher temperature than compared to the air entering in the upstream position 15 (inducer). Temperatures in excess of 1000° F. can be experienced at downstream position 16 (exducer). Thus, the structure in the downstream position 16 is particularly subject to high temperature creep and fatigue and is another area that may require welding repair.

An individual airfoil 10 may further be described as defining a leading edge 20. Leading edge 20 is the generally ridge-like surface that extends in height from airfoil 10. Additionally each airfoil 10 defines a pressure face 21 and back face 22. Pressure face 21 is that face of airfoil 10 that spins into the air being compressed when an airfoil rotates. Back face 22 is the opposite face of the airfoil 11. Neighboring airfoils define a valley 23 therebetween. It can also be stated that valley 23 is bounded by neighboring airfoils. As used in this specification, the term "valley" refers to the empty space, or volume, that is defined between two neighboring airfoils on an impeller or blisk. The valley face 24 is that portion of the impeller or blisk structure that lies between neighboring airfoils. Thus the valley face 24 forms a bottom boundary of a valley 23. Similarly a pressure face 21 of an airfoil forms a boundary of a valley, and a back face 22 forms another boundary of a valley. By the open nature of the impeller/blisk structure, there is no upper boundary on a valley 23. Similarly, the valley is unbounded at the inducer and exducer positions.

Figure 2:
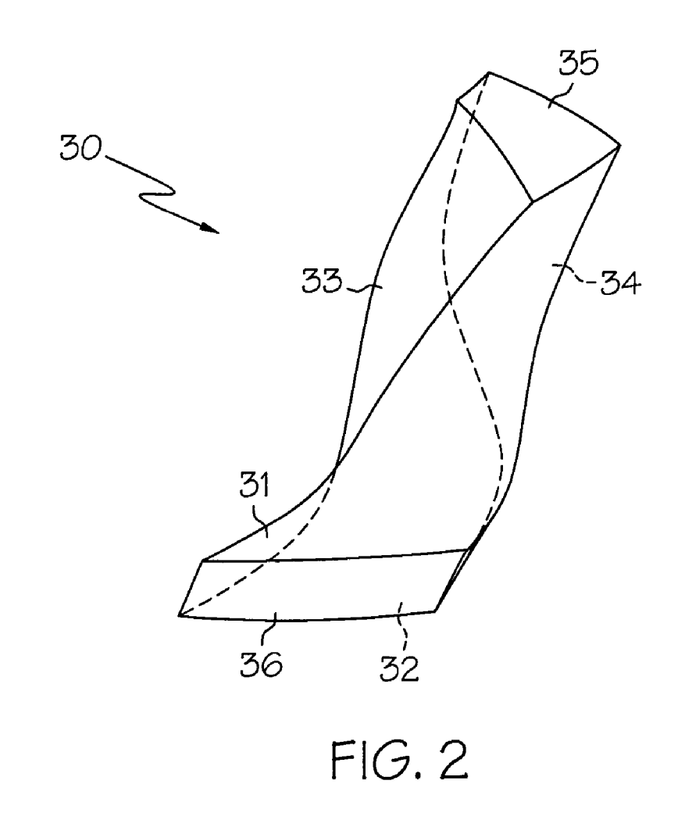
FIG. 2 is a perspective view of a welding shield according to an embodiment of the invention.
Figure 3:
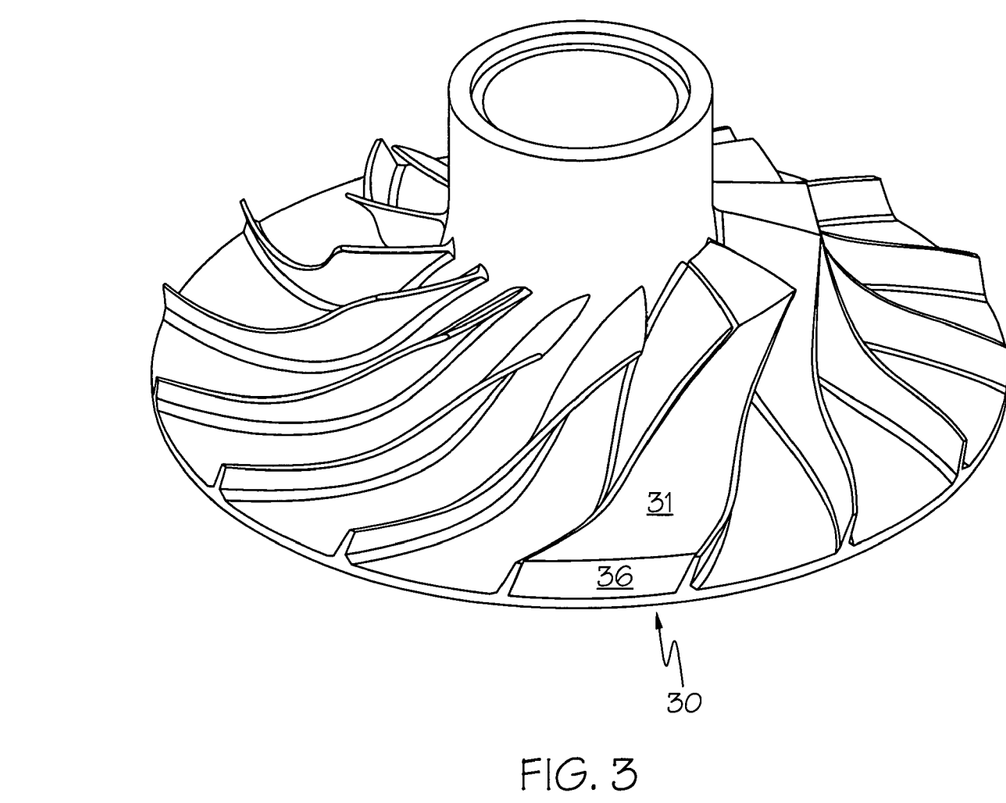
FIG. 3 is a perspective view of a welding shield disposed in an impeller, according to an embodiment of the invention.

Referring now to FIGS. 2 and 3 there is shown a first embodiment of a welding shield for use with automated welding repairs. Shield 30 is a generally rigid structure that generally conforms to the shape defined by a valley 23 of a given impeller or blisk.

A preferred embodiment of shield 30 is shown in FIG. 3 positioned for use in an impeller. As shown a shield has a top face 31 and bottom face 32 which are positioned on opposite sides of the shield body. Top face 31 is that face of shield 30 which is generally exposed to the air when shield 30 is positioned in impeller. Top face 31 may extend beyond the limit of leading edge 20 when in position. However, preferably top face 31 does not extend greatly beyond that distance. Correspondingly, bottom face 32 is that face of shield 30 which abuts against the valley face 24. Additionally, shield has a front face 33 and rear face 34, also oppositely positioned. Front face 33 is that face of shield 30 which abuts against back face 22 of impeller airfoil 11 when shield 30 is positioned. Correspondingly, rear face 34 is that face of shield 30 which abuts against pressure face 21 of impeller airfoil 11 when positioned. It will be noted that when in position shield 30 rests against a pressure face 21 and back face 22 of separate but neighboring airfoils 11. Additionally, shield 30 comprises an inducer edge 35 and exducer edge 36.

The preferred embodiment of shield 30 is illustrated as having relatively sharp, flat faces 31, 32, 33, 34, 35, and 36. However, other shapes and forms are also possible. In particular, those portions of shield 30 that are not designed to abut against any face or portion of an impeller/blisk; specifically top face 31, inducer edge 35, and exducer edge 36, may take other shapes such as being rounded or curved. Tabs or grabs may be molded into top face 31, inducer edge 35, and exducer edge 36. As for those portions of shield that are designed to be in contact with an impeller/blisk, referring to bottom face 32, front face 33, and rear face 34, these faces are preferably designed to have a shape that corresponds to the shape of the valley that they will contact. Thus, for example, if a cross section of pressure face 21 for a given impeller has a concave curvature, then the rear face 34 of a shield designed to fit that impeller would have a corresponding convex curvature.

It is preferred, though it is not necessary that shield 30 be in substantial contact where rear face 34 meets pressure face 21 and where front face 33 meets back face 22. Substantial contact means that degree of contact needed to hold shield securely in a valley during an automated welding operation. This degree of substantial contact is preferred in order to maintain a strong fit when shield 30 is placed in a valley. Less than substantial contact may be used, for example, when means other than pressure are used to secure shield in a valley.

In a preferred embodiment, shield 30 is formed by a manufacturing process that allows for the formation of complex shapes. Injection molding is one preferred manufacturing process. Shield 20 may be formed of any material that allows the formation of a generally rigid form. In one preferred embodiment, shield is formed of a material that is subject to injection molding. Rubbers or polymers are preferred materials for manufacturing shield 30. Composite construction techniques may also be used to manufacture a shield. Thus, for example, shield 30 may have an exterior of one type of material and an interior of a different material. In one embodiment, top face 31 of shield 30 is manufactured, coated, or impregnated with a welding resistant material.

Shield 30 is described as generally rigid. In a preferred embodiment, shield 30 does have some flexibility. It is sufficiently flexible, for example, to be fitted in the valley area of an impeller or blisk. However, it is generally rigid in that it holds its manufactured shape both when shield is in place in an impeller and when not. Where, for example, shield is 30 is constructed of rubber or polymer, the material is preferably selected to as to provide a slight degree of yield, when compressed, in the finished shape. This is advantageous when a shield is manufactured to be slightly oversize as described below. However, when in place in an impeller or blisk valley, shield 30 generally retains its shape by filling and occupying the volume of the valley.

In one embodiment, shield 30 is actually manufactured to be slightly oversize as compared to the volume defined by the impeller valley where it is to be used. This slight oversize provides a certain degree of snugness in the fitting when shield is put in place. For example, when manufactured in the slightly oversized embodiment, the shield walls, front face 33 and rear face 34, that will fit against the pressure face 21 and back face 22 of impeller airfoils 11 will yield slightly when put in place on the impeller. This yield creates a certain amount of force that holds the shield in place. The degree of force generated from the oversizing of shield 30 is preferably an amount of force sufficient to hold shield 30 within an impeller valley 23 during an automated welding operation.

Other attachment means can also be used to hold shield 30 in the desired position of an impeller or blisk valley 23. For example adhesives, tapes, and mechanical holders may be used.

In manufacturing shield 30, sizing and dimension information for the shield can be taken from blueprint data of the matching impeller/blisk. It will be noted that a given size shield matches or corresponds to an impeller or blisk. The shield matches in that it will fit securely in the valley of the impeller/blisk. Thus, different impellers will have different shields. The impeller, for example, if digitally designed will have data that defines the spacing between neighboring airfoils at different locations. This information can be used to design a form-fitting shield.

In a preferred embodiment shield 30 extends along the full length of valley 23. Thus shield 30 extends such that, when in place, shield 23 extends to the inducer and exducer regions of valley 23. It is preferred that the body of shield 30 be sized so that, when in place in valley 23, little to no material of the boundary faces of that valley are exposed. In this way, shield 30 provides a maximum degree of protection for that area. It is preferred, however, that shield 30 not extend unnecessarily far past the edge of a given impeller/blisk so as not to interfere with any automated welding equipment or operation.

Heretofore, shield 30 has been described as being adapted for welding techniques related to impellers and blisks found in gas turbine engines. While shield 30 is well suited to that kind of application, it can also be used with other similar but different structures. It should be noted that the general shape and structure of a gas turbine impeller is also true of other rotary devices such as turbines found in turbochargers and turbopumps. Thus, the welding shield as described herein may also be used with turbine engine compressors, centrigugal compressors, integrally bladed rotors, compressor blades and vanes, fan blades, and turbine blades, all in addition to impellers and blisks. The principles of the invention described herein are thus applicable to these devices as well.

Having described the invention from a structural standpoint, a method and manner of using the invention will now be described.

Once an impeller, blisk, or other device is identified for repair, a shield (or multiple shields) is selected. The shield is selected such that the dimensions of the shield fit the valley of the impeller. In other words, a shield is selected with the right size for the given impeller so that the shield will fit in place.

The shield is placed in a valley. If desired an adhesive or other securing mechanism may be used to hold the shield in place. Preferably the shield is placed in a position where it is suspected that welding damage may occur. Thus, for example, if a welding operation is to take place in one valley, the adjacent valleys may each receive a shield. Optionally, all valleys of a device that are not being welded may be protected. The shield(s) is put in place before the welding operation begins. Upon completion of the welding operation the shield is removed.

In certain automated welding operations it may be desired to successively weld a series of points on an impeller/blisk. For example, it may be desired to conduct a welding operation on each of a series of valley areas. In such a situation a set of welding shields may be utilized to protect the impeller/blisk. Beginning with the first valley to be welded, other valleys as desired receive a shield. By repositioning these shields, after the completion of a welding operation in a particular valley and before beginning welding in the next valley, the remaining areas may be protected. Thus, as the welding operation proceeds from the first valley to successive valleys, so too the shields are repositioned from surrounding the first valley to surrounding each successive valley. In this manner, during each particular welding operation in one valley, the other areas are protected.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A shield apparatus for disposal between two adjacent blades of an impeller during a weld repair process, each blade extending radially outwardly from and axially along a shaft and including a first and a second side joined together by a forward edge, an aft edge, and a side edge extending therebetween, the first and second sides each having a predetermined contour, the shield apparatus comprising:
   a forward end wall configured to extend and have a width substantially equal to a space between the forward edges of the two adjacent blades;
   an aft end wall configured to extend and have a width substantially equal to a space between the aft edges of the two adjacent blades;
   a first and a second side wall each extending between the forward and aft end walls, the first and second side walls each corresponding to and contoured to substantially mate with the predetermined contour of the corresponding first and second sides of the first and second blades, respectively; and
   a top wall extending between the first and second side walls and having a width that is substantially equal to a width between the side edges of the two adjacent blades,
   wherein a valley is defined between the two adjacent blades and the shield apparatus is sized larger than the valley.

2. The shield apparatus of claim 1 wherein the blades extend from a disk and the apparatus further comprises:
   a bottom wall extending between the first and second side walls and having a width that is substantially equal to the width between the side edges of the two adjacent blades.

3. The shield apparatus of claim 2, further comprising an adhesive bonded to a portion of the bottom wall.

4. The shield apparatus of claim 1, further comprising h tab formed on the top wall.

5. The shield apparatus of claim 1, further comprising a tab formed on the forward end wall.

6. The shield apparatus of claim 1, further comprising a tab formed on the aft end wall.

7. The shield apparatus of claim 1, wherein the apparatus comprises a polymer.

8. The shield apparatus of claim 1, wherein the apparatus comprises rubber.

9. The shield apparatus of claim 1, wherein at least one of the forward end wall, the aft end wall, the first and second side walls, and the top wall is substantially flat.

10. The shield apparatus of claim 1, wherein at least one of the forward end wail, the aft end wall, and the top end wall is curved.

11. The shield apparatus of claim 1, wherein the top wall includes welding resistant material thereon.

12. A method for repairing a worn section of an impeller, the impeller including a plurality of blades extending radially outwardly from and axially along a shaft, the blades each including a first and a second side joined together by a forward edge, an aft edge, and a side edge extending therebetween, the first and second sides each having a predetermined contour, the worn section disposed proximate at least one of the blades, the method comprising:
   inserting a shield apparatus into a valley between a first pair of adjacent blades of the plurality of blades, the shield apparatus sized larger than the valley and comprising:

a forward end wall configured to extend and have a width substantially equal to a space between the forward edges of the first pair of adjacent blades;

an aft end wall configured to extend and have a width substantially equal to a space between the aft edges of the first pair of adjacent blades;

a first and a second side wall each extending between the forward and aft end walls, the first and second side walls each corresponding to and contoured to substantially mate with the predetermined contour of the corresponding first and second sides of the first pair of adjacent blades, respectively and a top wall extending between the first and second side walls and having a width that is substantially equal to a width between the side edges of the first pair of adjacent blades; and welding the impeller worn section.

13. The method of claim 12, further comprising inserting a second shield apparatus between a second pair of adjacent blades.

14. The method of claim 12, further comprising removing the shield apparatus and inserting the shield apparatus between a second pair of adjacent blades.

* * * * *

UNITED STATES PATENT AND TRADEMARK OFFICE
CERTIFICATE OF CORRECTION

PATENT NO. : 7,247,000 B2  
APPLICATION NO. : 10/930407  
DATED : July 24, 2007  
INVENTOR(S) : Christopher L. Cahoon et al.

It is certified that error appears in the above-identified patent and that said Letters Patent is hereby corrected as shown below:

Column 8, line 37, "h" should be changed to --a--;  
Column 8, line 51, "wail" should be changed to --wall--.

Signed and Sealed this

Twenty-fourth Day of June, 2008

JON W. DUDAS  
*Director of the United States Patent and Trademark Office*